US012316037B2

(12) United States Patent
Yayoshi et al.

(10) Patent No.: US 12,316,037 B2
(45) Date of Patent: May 27, 2025

(54) CONNECTOR, MATING CONNECTOR AND CONNECTION DEVICE

(71) Applicant: Japan Aviation Electronics Industry, Limited, Tokyo (JP)

(72) Inventors: Tadamichi Yayoshi, Tokyo (JP); Yosuke Honda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 367 days.

(21) Appl. No.: 18/100,711

(22) Filed: Jan. 24, 2023

(65) Prior Publication Data

US 2023/0246355 A1 Aug. 3, 2023

(30) Foreign Application Priority Data

Jan. 28, 2022 (JP) ................................ 2022-011661
Feb. 15, 2022 (JP) ................................ 2022-021499
May 30, 2022 (JP) ................................ 2022-087366

(51) Int. Cl.
*H01R 12/71* (2011.01)
*H01R 13/50* (2006.01)

(52) U.S. Cl.
CPC ........... *H01R 12/716* (2013.01); *H01R 13/50* (2013.01)

(58) Field of Classification Search
CPC ....... H01R 12/00; H01R 12/52; H01R 12/716
USPC ..................................................... 439/74, 660
See application file for complete search history.

(56) References Cited

U.S. PATENT DOCUMENTS

| | | |
|---|---|---|
| 8,986,027 B2 | 3/2015 | Nishimura et al. |
| 2016/0268715 A1 | 9/2016 | Kodaira |

FOREIGN PATENT DOCUMENTS

| | | |
|---|---|---|
| JP | 2012-033439 A | 2/2012 |
| JP | 2014-093292 A | 5/2014 |
| JP | 2016-152083 A | 8/2016 |
| KR | 10-2014-0055991 A | 5/2014 |
| KR | 10-1912622 B1 | 10/2018 |

OTHER PUBLICATIONS

Korean Office Action dated Nov. 25, 2024 in Korean Application No. 10-2023-0010649, with English translation.

*Primary Examiner* — Neil Abrams
(74) *Attorney, Agent, or Firm* — Collard & Roe, P.C.

(57) ABSTRACT

A connector comprises a housing having a bottom portion and terminals including inner terminals. The bottom portion has a projecting portion and two base portions. The projecting portion projects from the base portions in an upper-lower direction (Z-direction). Each of the base portions has at least one predetermined portion. The predetermined portion includes two passing holes and a separating portion. Each of the passing holes passes through the base portion in the upper-lower direction. The separating portion separates the two passing holes from each other in the pitch direction (Y-direction) and is connected to the projecting portion in the lateral direction (X-direction). Each of the inner terminals has a solderable portion. The solderable portions are partially located in the passing holes, respectively.

7 Claims, 9 Drawing Sheets

CONNECTOR, MATING CONNECTOR AND CONNECTION DEVICE

CROSS REFERENCE TO RELATED APPLICATIONS

This application is based on and claims priority under 35 U.S.C. § 119 to Japanese Patent Applications No. JP 2022-011661 filed Jan. 28, 2022, No. JP 2022-021499 filed Feb. 15, 2022 and No. JP 2022-087366 filed May 30, 2022, the contents of which are incorporated herein in their entirety by reference.

BACKGROUND OF THE INVENTION

This invention relates to a connector comprising a plurality of terminals arranged with short distances.

For example, this type of connector is disclosed in JP2016-152083A (Patent Document 1), the content of which is incorporated herein by reference.

Referring to FIG. 16, Patent Document 1 discloses a connector 90 configured to be mounted on a board 98. The connector 90 comprises a housing 91 molded out of resin, a large number of first contacts (outer terminals) 94 and a large number of second contacts (inner terminals) 96. The outer terminals 94 and the inner terminals 96 are arranged with short distances. Each of the inner terminals 96 has a solderable portion 97. The housing 91 has a bottom portion formed with a plurality of openings (passing holes) 92 which correspond to the solderable portions 97, respectively. The solderable portions 97 are partially located in the passing holes 92, respectively. This arrangement enables a visual inspection of whether the solderable portions 97 are properly soldered on the board 98 or not.

The bottom portion of the housing 91 has a plurality of separating portions 93. Each of the separating portions 93 is located between two of the passing holes 92 adjacent to each other in a pitch direction. This structure prevents the housing 91 from being lowered in strength although the housing 91 is formed with the passing holes 93.

When the inner terminals 96 are increased in number with the housing 91 unchanged in size, a distance between adjacent passing holes, or two of the passing holes 94 adjacent to each other in the pitch direction, is reduced. In other words, when the housing 91 is molded out of resin by using a metal die which has two parts configured to form the adjacent passing holes and is formed with a gap which correspond to the separating portion 93 and is located between the two parts of the metal die, the gap inevitably has a small size. As a result, the resin is hardly poured into the gap, and thereby the separating portion 93 might be insufficiently formed. As can be seen from the explanation described above, the connector of Patent Document 1 is not necessarily suitable for arranging a large number of terminals.

SUMMARY OF THE INVENTION

It is therefore an object of the present invention to provide a new connector having a structure suitable for arranging a large number of terminals and a mating connector mateable with this new connector.

An aspect of the present invention provides a connector comprising a housing and a plurality of terminals. The housing has two sidewalls, two edge walls and a bottom portion. Each of the sidewalls extends along a pitch direction. The sidewalls are apart from each other in a lateral direction perpendicular to the pitch direction. The edge walls are located at opposite ends of the housing in the pitch direction, respectively. The bottom portion couples the sidewalls together. The bottom portion has a projecting portion and two base portions which correspond to the sidewalls, respectively. The base portions are located at opposite sides of the projecting portion in the lateral direction, respectively. The projecting portion projects from the base portions in an upper-lower direction perpendicular to both the pitch direction and the lateral direction and is connected to at least one of the edge walls in the pitch direction. Each of the base portions has at least one predetermined portion. Each of the predetermined portions includes two passing holes and a separating portion. Each of the passing holes passes through the base portion in the upper-lower direction. Each of the separating portions separates the two passing holes from each other in the pitch direction and is connected to the projecting portion and a corresponding one of the sidewalls in the lateral direction. The terminals are divided into two terminal rows which correspond to the sidewalls, respectively. Each of the terminal rows includes at least two inner terminals. Each of the inner terminals has a held portion and a solderable portion. The held portion of each of the inner terminals is held by a corresponding one of the sidewalls. The solderable portions of the inner terminals are partially located in the passing holes, respectively.

The projecting portion of the connector of an aspect of the present invention projects in the upper-lower direction from the base portion having the passing holes and the separating portion and is connected to at least one of the edge walls, namely a predetermined edge wall. The projecting portion and the separating portion which are arranged as described above can be molded out of resin by using a metal die which is formed with a first groove corresponding to the projecting portion and a second groove corresponding to the separating portion. When the housing is molded, the resin is poured from a gate located in the vicinity of the predetermined edge wall into the first groove having a relatively large cross-section, and the resin can be poured downward into the second groove from the first groove. According to this molding method, the separating portion can be reliably formed even when the second groove has a small size in the pitch direction.

As apparent from the explanation described above, the present invention can provide a new connector having a structure suitable for arranging a large number of terminals. In addition, the present invention can provide a mating connector having a structure corresponding to the structure of this new connector, or a mating connector mateable with this new connector.

An appreciation of the objectives of the present invention and a more complete understanding of its structure may be had by studying the following description of the preferred embodiment and by referring to the accompanying drawings.

Figure 1:
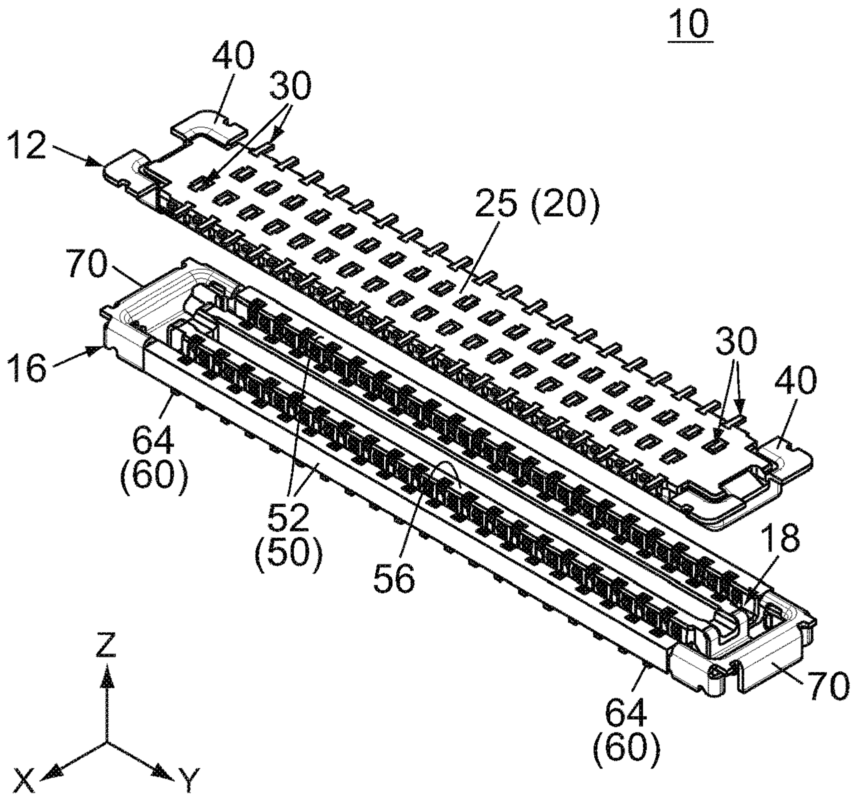
FIG. 1 is a perspective view showing a connection device according to an embodiment of the present invention, wherein the connection device is under a separated state where a connector and a mating connector thereof are separated from each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
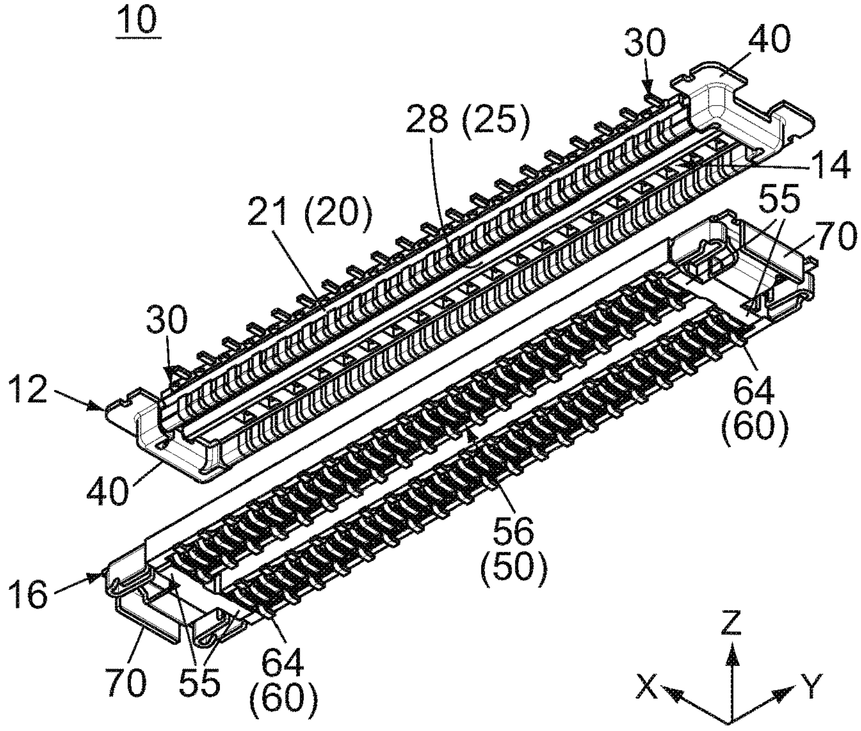
FIG. 2 is another perspective view showing the connection device of FIG. 1.
Figure 12:
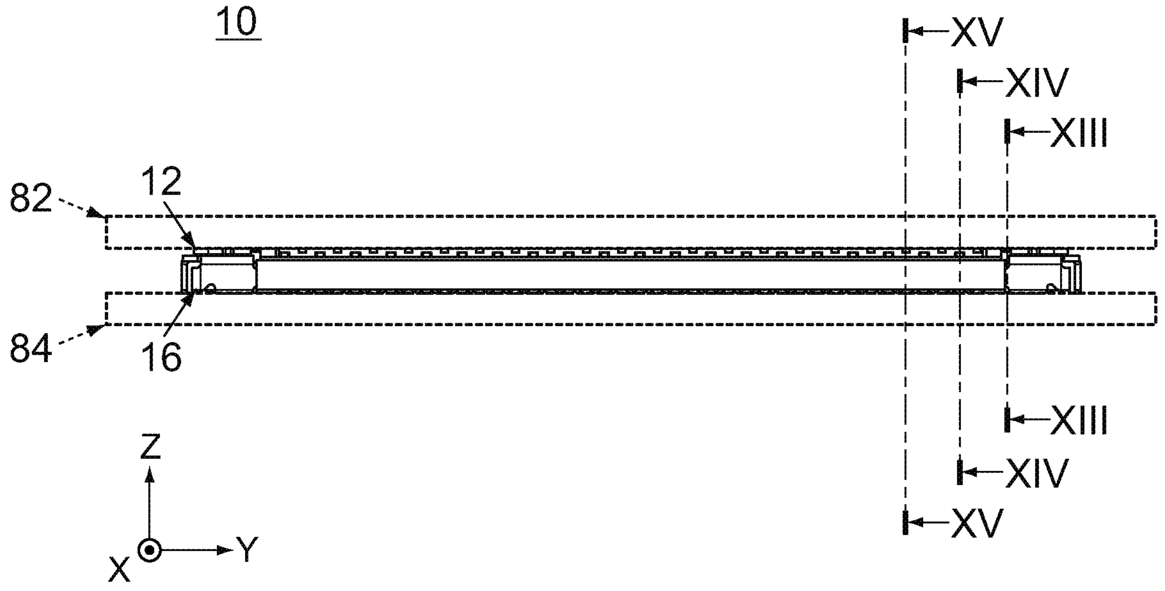
FIG. 12 is a side view showing the connection device of FIG. 1, wherein the connection device is under a mated state where the connector and the mating connector are mated with each other, and a part of an outline of the board and a part of an outline of mating board are illustrated with dashed line.

As shown in FIGS. 1, 2 and 12, a connection device 10 according to an embodiment of the present invention comprises a connector 12 which is a plug and a mating connector 16 which is a receptacle. The connector 12 is a so-called on-board connector configured to be mounted on a board 82. The mating connector 16 is another on-board connector configured to be mounted on a mating board 84. The connector 12 is mateable with the mating connector 16 along an upper-lower direction. The board 82 and the mating board 84 are electrically connected with each other under a mated state where the connector 12 and the mating connector 16 are mated with each other. The upper-lower direction of the present embodiment is the Z-direction. In the present embodiment, "upward" means the positive Z-direction, and "downward" means the negative Z-direction.

Referring to FIGS. 1 and 2, the connector 12 of the present embodiment comprises a housing 20 made of insulator, a plurality of terminals 30 each made of conductor and two holddowns 40 each made of conductor. The connector 12 of the present embodiment comprises only the aforementioned members. However, the present invention is not limited thereto. For example, the connector 12 may further comprise another member in addition to the aforementioned members. Instead, the holddowns 40 may not be provided.

Figure 6:
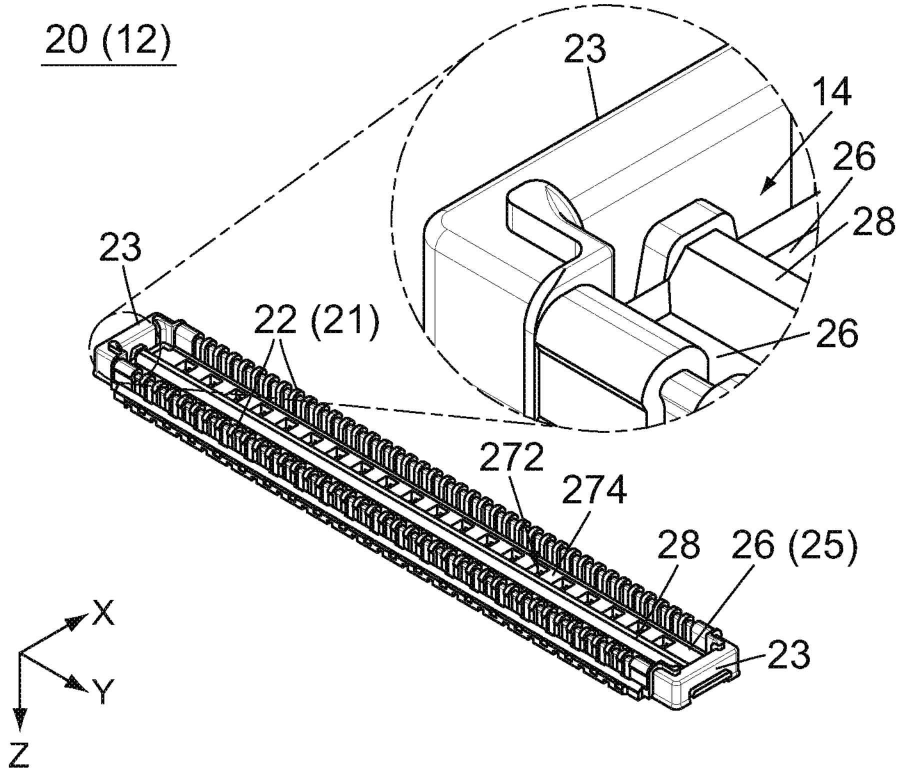
FIG. 6 is a perspective view showing a housing of the connector of FIG. 3, wherein a part of the housing enclosed by chain dotted lines is enlarged and illustrated.
Figure 7:
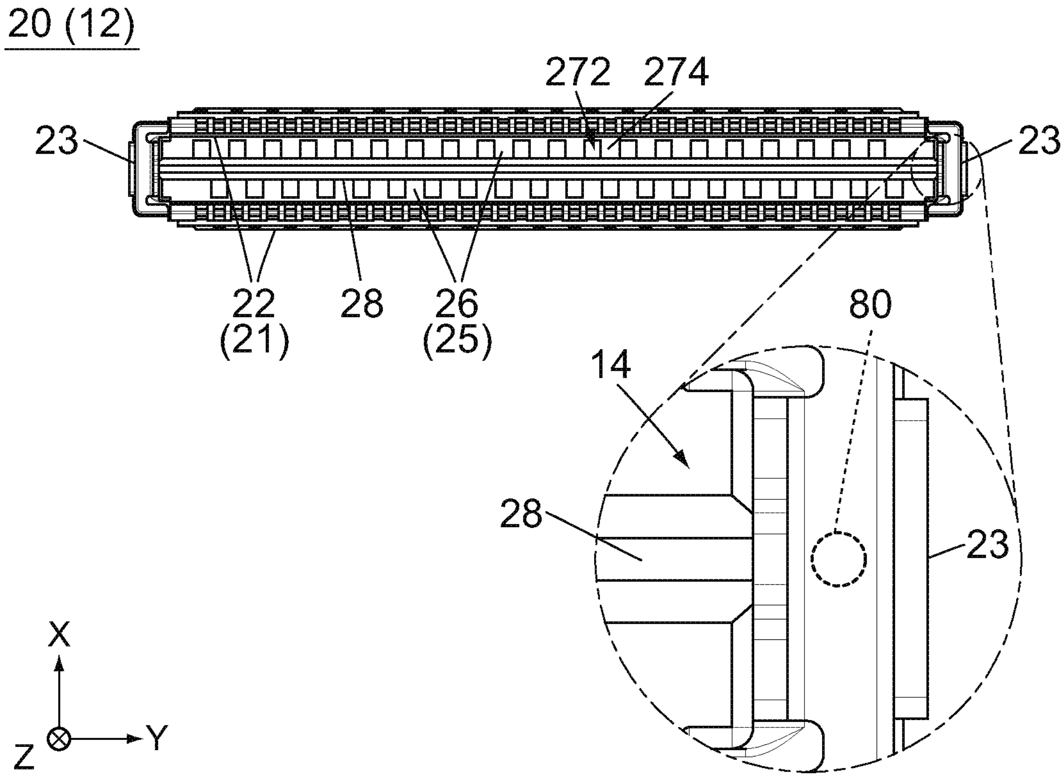
FIG. 7 is a plan view showing the housing of FIG. 6, wherein a part of the housing enclosed by chain dotted lines is enlarged and illustrated, and in the enlarged view, a position of a gate which is used for molding the housing is illustrated with dashed line.

Referring to FIGS. 6 and 7, the housing 20 of the present embodiment is a single member molded out of resin. However, the present invention is not limited thereto. For example, the housing 20 may be formed of a main member molded out of resin and additional members joined to the main member.

The housing 20 of the present embodiment has a peripheral wall 21 and a bottom portion 25. The peripheral wall 21 has two sidewalls 22 and two edge walls 23. Thus, the housing 20 has the two sidewalls 22 and the two edge walls 23.

The sidewalls 22 extend in parallel to each other. Each of the sidewalls 22 extends along a pitch direction perpendicular to the upper-lower direction. The pitch direction of the present embodiment is the Y-direction. The sidewalls 22 are apart from each other in a lateral direction perpendicular to both the upper-lower direction and the pitch direction. The lateral direction of the present embodiment is the X-direction.

The edge walls 23 are located at opposite ends of the housing 20 in the pitch direction, respectively. Each of the edge walls 23 of the present embodiment extends along the lateral direction and couples the two sidewalls 22 together in the lateral direction. The thus-formed peripheral wall 21 has a rectangular shape with no gap in a horizontal plane (XY-plane) perpendicular to the upper-lower direction. However, the present invention is not limited thereto. For example, each of the edge walls 23 may be apart from the sidewalls 22 in the lateral direction.

The bottom portion 25 couples the two sidewalls 22 together in the lateral direction. The bottom portion 25 of the present embodiment couples the two edge walls 23 together in the pitch direction. However, the present invention is not limited thereto. For example, the bottom portion 25 may be apart from one of the two edge walls 23 in the pitch direction.

The bottom portion 25 has a projecting portion 28 and two base portions 26 which correspond to the sidewalls 22, respectively. The base portions 26 are located at opposite sides of the projecting portion 28 in the lateral direction, respectively. In other words, each of the base portions 26 is located between the projecting portion 28 and the corresponding sidewall 22 in the lateral direction. The projecting portion 28 projects from the base portions 26 in the upper-lower direction. More specifically, the projecting portion 28 of the present embodiment projects downward from the base portions 26. Each of the base portions 26 and the projecting portion 28 of the present embodiment extends through the whole bottom portion 25 along the pitch direction. However, the present invention is not limited thereto. For example, each of the base portions 26 may be located only at the middle of the bottom portion 25 in the pitch direction.

The projecting portion 28 of the present embodiment extends along the pitch direction with no gap and is connected to the two edge walls 23 in the pitch direction. According to this structure, when the housing 20 is molded out of resin, the whole projecting portion 28 can be formed by a molding method in which the resin is poured from one gate 80 (inlet) which is located on a side corresponding to a bottom surface of the housing 20, or the positive Z-side of the housing 20. However, the present invention is not limited thereto. For example, the projecting portion 28 may include two parts which are apart from each other in the pitch direction. These two parts may be connected to the two edge walls 23, respectively. Instead, the projecting portion 28 may be a single part which is connected to only one of the edge walls 23 in the pitch direction. Thus, the projecting portion 28 may be connected to at least one of the edge walls 23 in the pitch direction.

Each of the base portions 26 of the present embodiment is provided with a large number of passing holes 272 and a large number of separating portions 274. Each of the passing holes 272 has a rectangular shape in the XY-plane and passes through the base portion 26 in the upper-lower direction. The passing holes 272 of each of the base portions 26 are arranged in regular intervals along the pitch direction. Each of the separating portions 274 is located between two of the passing holes 272 adjacent to each other in the pitch direction. The thus-formed separating portions 274 of each of the base portions 26 are arranged in regular intervals along the pitch direction. Each of the separating portions 274 extends with no gap along the lateral direction from the projecting portion 28 to the corresponding sidewall 22.

The passing holes 272 and the separating portions 274 of the present embodiment have the aforementioned structure and are arranged as described above. However, the present invention is not limited thereto. For example, the arrangement of the passing holes 272 is not limited to the regular interval arrangement.

Figure 3:
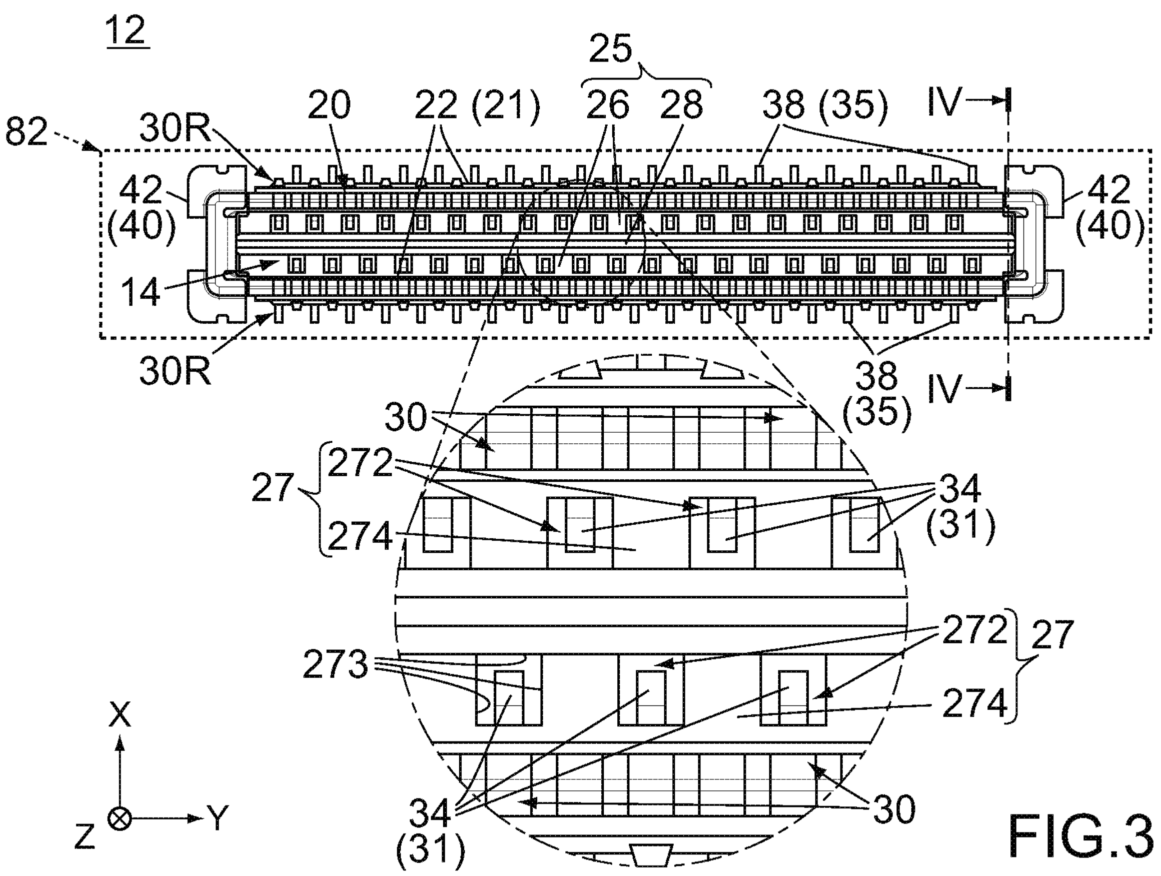
FIG. 3 is a plan view showing the connector of the connection device of FIG. 1, wherein a part of the connector enclosed by chain dotted lines is enlarged and illustrated, and a part of an outline of a board on which the connector is mounted is illustrated with dashed line.
Figure 4:
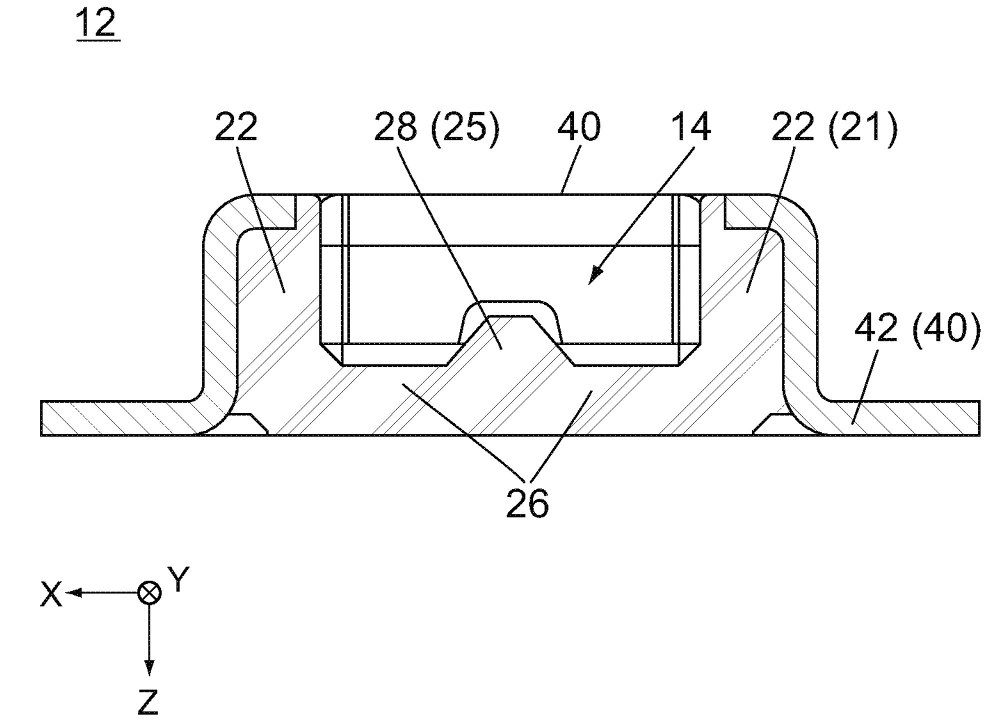
FIG. 4 is a cross-sectional view showing the connector of FIG. 3, taken along line IV-IV.
Figure 5:
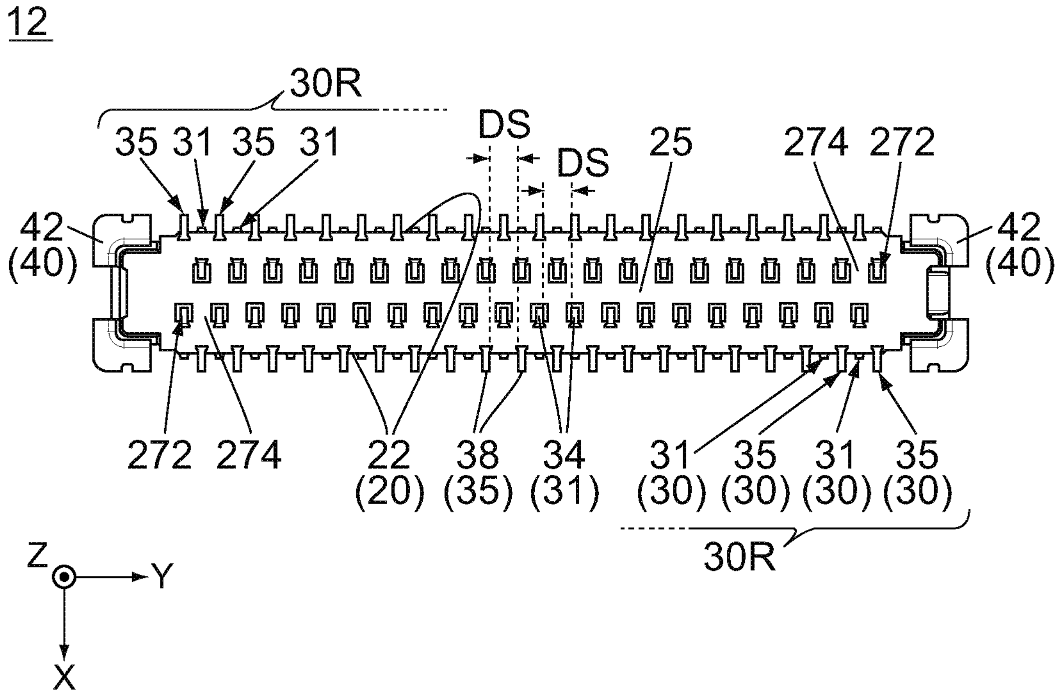
FIG. 5 is a bottom view showing the connector of FIG. 3.

Referring to FIGS. 3 to 5, each of the holddowns 40 of the present embodiment is formed by bending a single metal plate. In other words, each of the holddowns 40 is a single metal plate with bends. However, the present invention is not limited thereto. For example, each of the holddowns 40 may be formed of a plurality of members joined together, The holddowns 40 of the present embodiment have shapes same as each other. Each of the holddowns 40 has a fixable portion 42. The holddowns 40 of the present embodiment are insert-molded in the edge walls 23 of the housing 20, respectively, and strengthen the edge walls 23. When the connector 12 is mounted on the board 82, the fixable portion 42 is soldered on the board 82. However, the present invention is not limited thereto. For example, the holddowns 40 may be attached to the edge walls 23, respectively, after the housing 20 has been molded.

Referring to FIGS. 3 and 5, the terminals 30 are divided into two terminal rows 30R which correspond to the sidewalls 22, respectively. Each of the terminal rows 30R is arranged in the corresponding sidewall 22. Each of the terminal rows 30R of the present embodiment includes a large number of inner terminals 31 and a large number of outer terminals 35. The inner terminals 31 and the outer terminals 35 of each of the terminal rows 30R alternately arranged in regular intervals in the pitch direction.

The terminals 30 of the present embodiment are arranged as described above. However, the present invention is not limited thereto. For example, each of the terminal rows 30R may include only two of the inner terminals 31 and may include only one of the outer terminals 35. Thus, each of the terminal rows 30R may include at least two of the inner terminals 31 and at least one of the outer terminals 35. Each of the terminal rows 30R may include only of two the inner terminals 31.

Figure 14:
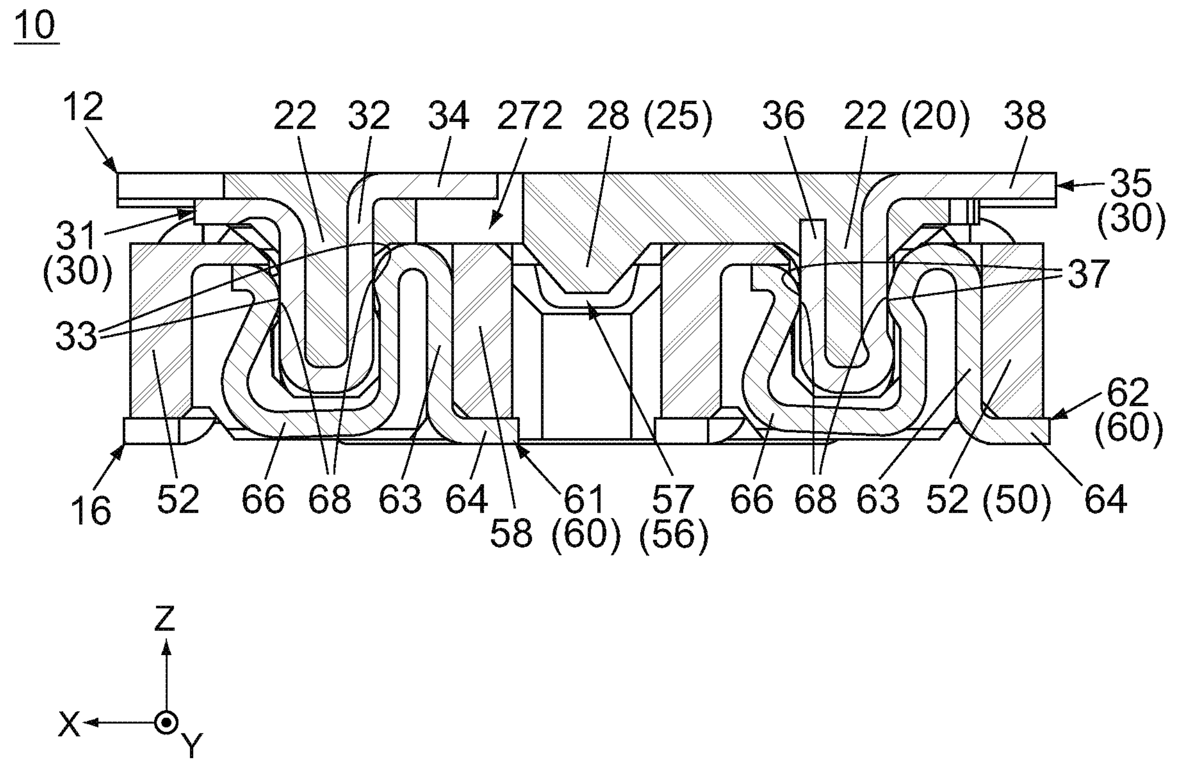
FIG. 14 is a cross-sectional view showing the connection device of FIG. 12, taken along line XIV-XIV.
Figure 15:
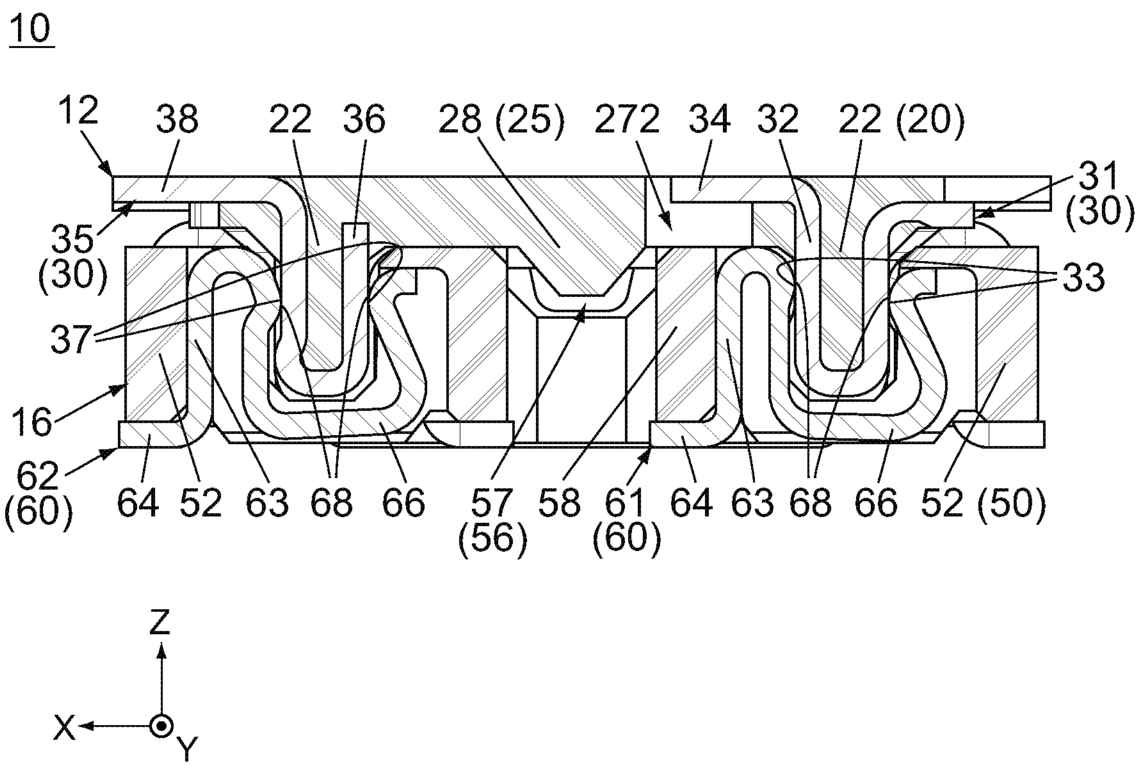
FIG. 15 is a cross-sectional view showing the connection device of FIG. 12, taken along line XV-XV.
Figure 16:
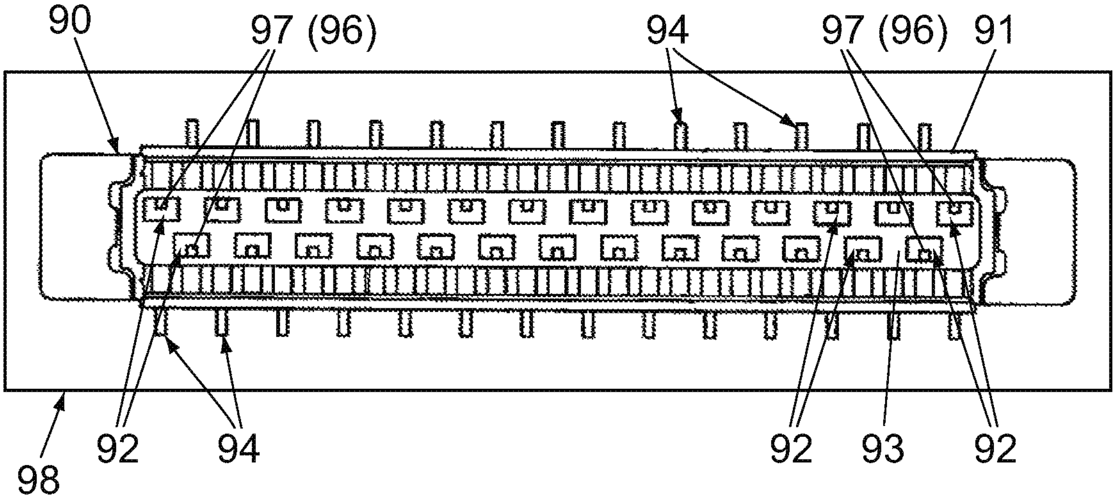
FIG.16 PRIOR ART
FIG. 16 is a plan view showing a connector of Patent Document 1 together with a board.

Referring to FIGS. 14 and 15, the inner terminals 31 of the present embodiment have shapes same as each other. Each of the inner terminals 31 is a single metal plate with bends. Each of the inner terminals 31 has a held portion 32 and a solderable portion 34.

The held portions 32 of the inner terminals 31 are held by the corresponding sidewall 22. Each of the held portions 32 of the present embodiment is insert-molded in the corresponding sidewall 22. Each of the held portions 32 is exposed from a lower surface of the corresponding sidewall 22 and is exposed from opposite surfaces of the corresponding sidewall 22 in the lateral direction. However, the present invention is not limited thereto. For example, each of the held portions 32 may be press-fit into the corresponding sidewall 22.

Each of the held portions 32 of the inner terminals 31 of the present embodiment is provided with two contact points 33. The contact points 33 of each of the inner terminals 31 are located on opposite surfaces of the held portion 32 in the lateral direction, respectively, and are electrically connected with the mating connector 16 under the mated state.

Referring to FIG. 3, the passing holes 272 are formed so that they correspond to the inner terminals 31, respectively. More specifically, the solderable portions 34 of the inner terminals 31 are partially located in the passing holes 272, respectively. When the connector 12 is mounted on the board 82, each of the solderable portions 34 is soldered on and is connected to a conductive pad (not shown) of the board 82. Each of the solderable portions 34 is apart from an inner wall surface 273 of the passing hole 272 in the XY-plane and is securely fixed on the board 82 by solder which covers sides of the solderable portion 34 in the XY-plane. This arrangement enables a visual inspection through the passing holes 272 for whether the solderable portions 34 are properly soldered on the board 82.

Referring to FIGS. 14 and 15, the outer terminals 35 of the present embodiment have shapes same as each other. Each of the outer terminals 35 is a single metal plate with bends. Each of the outer terminals 35 has a held portion 36 and a solderable portion 38.

The held portions 36 of the outer terminals 35 are held by the corresponding sidewall 22. Each of the held portions 36 of the present embodiment is insert-molded in the corresponding sidewall 22. Each of the held portions 36 is exposed from the lower surface of the corresponding sidewall 22 and is exposed from the opposite surfaces of the corresponding sidewall 22 in the lateral direction. However, the present invention is not limited thereto. For example, each of the held portions 36 may be press-fit into the corresponding sidewall 22.

Each of the held portions 36 of the outer terminals 35 of the present embodiment is provided with two contact points 37. The contact points 37 of each of the outer terminals 35 are located on opposite surfaces of the held portion 36 in the lateral direction, respectively, and are electrically connected with the mating connector 16 under the mated state.

The solderable portion 38 of each of the outer terminals 35 extends outward from the held portion 36 in the lateral direction and is located outward of the corresponding sidewall 22 in the lateral direction. Referring to FIG. 3, when the connector 12 is mounted on the board 82, each of the solderable portions 38 is fixed on a conductive pad (not shown) of the board 82 via soldering. The solderable portions 38 which are arranged as described above can be visually inspected along the upper-lower direction for whether they are properly soldered on the board 82.

Referring to FIG. 5, according to the present embodiment, the inner terminals 31 and the outer terminals 35 of each of the terminal rows 30R are alternately arranged along the pitch direction. In each of the terminal rows 30R, the solderable portions 34 of two of the inner terminals 31 adjacent to each other are apart from each other in the pitch direction by a distance DS, and the solderable portions 38 of two of the outer terminals 35 adjacent to each other are apart from each other in the pitch direction by the distance DS.

According to the aforementioned alternate arrangement, a distance between two of the terminals 30 adjacent to each other can be reduced in the pitch direction while the distance DS is kept to a value which is sufficiently large to prevent the solderable portions 38 from being short-circuited to each other. As a result, the connector 12 can be reduced in size in the pitch direction. However, the present invention is not limited thereto. For example, in each of the terminal rows 30R, two or more of the inner terminals 31 may be adjacent to each other, or two or more of the outer terminals 35 may be adjacent to each other.

Referring to FIG. 3, the connector 12 of the present embodiment has a shape which is asymmetric with respect to a vertical plane (YZ-plane) but is 2-fold symmetric about an axis extending in parallel to the upper-lower direction. The passing holes 272 of one of the base portions 26 and the passing holes 272 of a remaining one of the base portions 26 are alternately arranged in the pitch direction. In other words, all the passing holes 272 are zigzag arranged along the pitch direction.

The aforementioned zigzag arrangement increases a distance between the solderable portion 34 of the inner terminal 31 of one of the base portions 26 and the solderable portion 34 of the inner terminal 31 of a remaining one of the base portions 26 while the connector 12 is unchanged in size in the lateral direction. As a result, insulation properties can be improved. However, the present invention is not limited thereto. For example, the passing hole 272 of one of the base portions 26 and the passing hole 272 of a remaining one of the base portions 26 may be arranged side by side in the lateral direction.

Explaining the structure of the base portion 26 from another viewpoint with reference to FIG. 3, each of the base portions 26 of the present embodiment has a plurality of predetermined portions 27. Each of the predetermined portions 27 is a part of the base portion 26 and includes two of the passing holes 272 and one of the separating portions 274. The two passing holes 272 of each of the predetermined portions 27 are adjacent to each other in the pitch direction. Two of the predetermined portions 27 adjacent to each other in the pitch direction share one of the passing holes 272. The separating portion 274 of each of the predetermined portions 27 separates the two passing holes 272 from each other in the pitch direction and is connected to the projecting portion 28 and the corresponding sidewall 22 in the lateral direction.

Each of the base portions 26 of the present embodiment has a large number of the predetermined portions 27. However, the present invention is not limited thereto. For example, each of the base portions 26 may have only one of the predetermined portions 27. Thus, each of the base portions 26 should have at least one of the predetermined portions 27.

Referring to FIGS. 6 and 7, the projecting portion 28 of the connector 12 of the present embodiment projects in the upper-lower direction from the base portion 26 having the passing holes 272 and the separating portions 274 and is connected to at least one of the edge walls 23, namely a predetermined edge wall 23. The projecting portion 28 and the separating portions 274 which are arranged as described above can be molded out of resin by using a metal die (not shown) formed with a first groove (not shown) which corresponds to the projecting portion 28 and second grooves (not shown) which correspond to the separating portions 274, respectively. As can be seen from the structure that the projecting portion 28 extends from a part located in the vicinity of the gate 80, in a molding process of the housing 20, the resin is poured from the gate 80 located in the vicinity of the predetermined edge wall 23 into the first groove having a relatively large cross-section. The thus-poured resin can flow into the second grooves from the first groove.

If the projecting portion 28 is not formed, the first groove (not shown) will have a small cross-section. In an attempt of pouring the resin into the second grooves (not shown) each having a small cross-section through the first groove having a small cross-section, the resin might be blocked because of viscosity of the resin before the resin is moved to the far end of the second groove. As a result, the separating portion 274 might be insufficiently formed, and thereby the bottom portion 25 of the housing 20 formed with a large number of the passing holes 272 might be reduced in strength.

In contrast, according to the present embodiment, a large amount of resin larger than that in an instance where the projecting portion 28 is not formed can be poured from the gate 80 into the first groove (not shown) having a large cross-section. This large amount of resin poured from the gate 80 pushes the resin which flows into the second grooves (not shown), and thereby the resin is moved against its viscosity and fills the whole second grooves. According to the molding method of the present embodiment, the first groove works as a large channel in which the resin flows, and the separating portions 274 can be reliably formed even when each of the second grooves has a small size in the pitch direction. In addition, the thus-formed projecting portion 28 strengthens the housing 20 and makes the housing 20 unbendable. Thus, the present embodiment provides the connector 12 which is new and has a structure suitable for arranging a large number of terminals.

According to the present embodiment, the projecting portion 28 and all the separating portions 274 can be formed by using the only one gate 80. According to this manufacturing method, the manufacturing cost of the connector 12 can be reduced. However, the present invention is not limited thereto. For example, the projecting portion 28 and all the separating portions 274 may be formed by using two of the gates 80. In this instance, the projecting portion 28 may include two parts which are apart from each other in the pitch direction and are connected to the edge walls 23, respectively. However, according to a manufacturing method in which two or more of the gates 80 are provided, a weld line might be generated, and the housing 20 might be reduced in strength. Therefore, the number of the gate 80 is preferred to be one. According to this manufacturing method, the projecting portion 28 is preferred to extend with no gap along the pitch direction from a part located in the vicinity of the gate 80 to the edge wall 23 located opposite to the gate 80 in the pitch direction as shown in the present embodiment.

Referring to FIG. 2 together with FIG. 3, the connector 12 of the present embodiment has a receiving portion 14. The receiving portion 14 is a space enclosed by the sidewalls 22, the edge walls 23 and the bottom portion 25. The receiving portion 14 partially receives the mating connector 16 under the mated state. The mating connector 16 has a structure corresponding to the structure of the connector 12 as described below. Hereafter, explanation will be made about the mating connector 16 of the present embodiment.

Referring to FIGS. 1 and 2, the mating connector 16 of the present embodiment comprises a mating housing 50 made of insulator, a plurality of mating terminals 60 each made of conductor and two mating holddowns 70 each made of conductor. The mating connector 16 of the present embodiment comprises only the aforementioned members. However, the present invention is not limited thereto. For example, the mating connector 16 may further comprise another member in addition to the aforementioned members.

Figure 8:
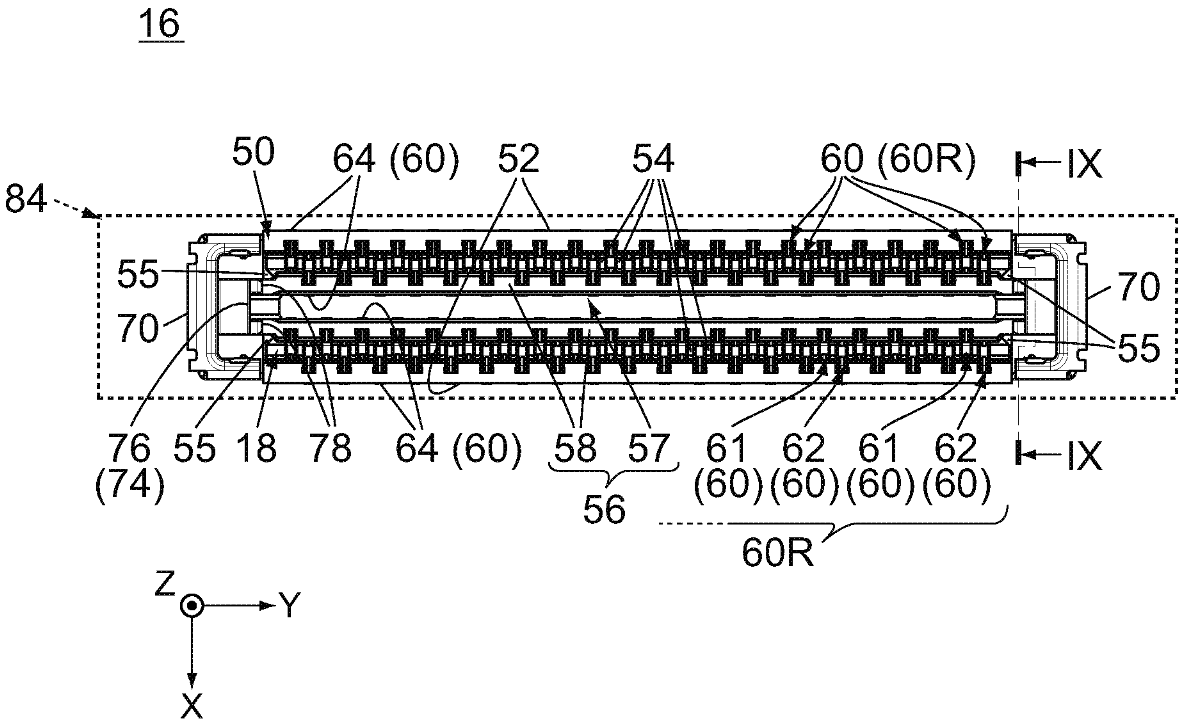
FIG. 8 is a plan view showing the mating connector of the connection device of FIG. 1, wherein a part of an outline of a mating board on which the mating connector is mounted is illustrated with dashed line.

Referring to FIG. 8 together with FIGS. 1 and 2, the mating housing 50 of the present embodiment is a single member molded out of resin. The mating housing 50 has two mating sidewalls 52, an island-like portion 56, four coupling portions 55 and a large number of separators 54. The mating sidewalls 52 extend in parallel to each other. Each of the mating sidewalls 52 extends along the pitch direction. The island-like portion 56 is located between the two mating sidewalls 52 in the lateral direction and extends along the pitch direction. The island-like portion 56 is coupled to the mating sidewalls 52 by the coupling portions 55 and the separators 54.

Figure 10:
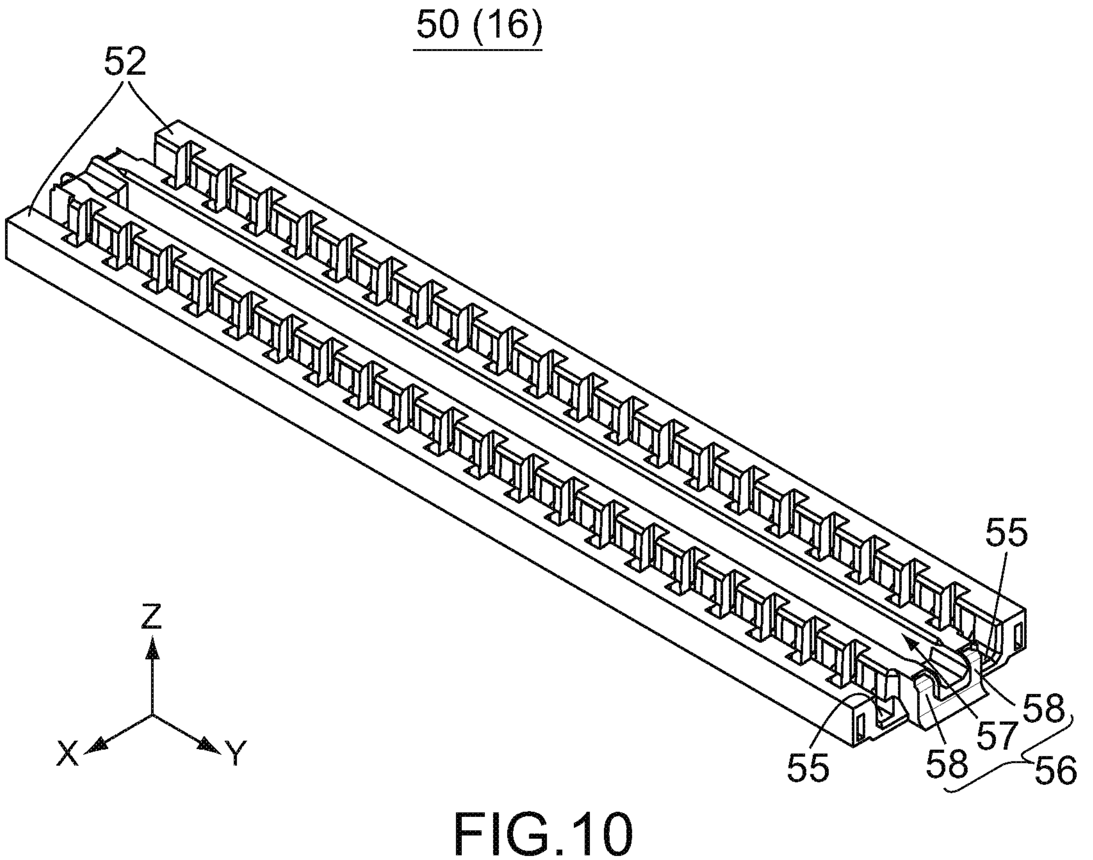
FIG. 10 is a perspective view showing a mating housing of the mating connector of FIG. 8.

Referring to FIG. 10, the island-like portion 56 of the present embodiment extends along the pitch direction beyond opposite ends of the mating sidewalls 52 in the pitch direction. The mating housing 50 of the present embodiment does not have any parts such as walls which are located at opposite sides of the island-like portion 56 in the pitch direction. According to this structure, when the mating housing 50 is molded, the island-like portion 56 and the mating sidewalls 52 can be reliably molded out of a relatively small amount of resin. However, the present invention is not limited thereto. For example, the mating housing 50 may have two walls which are located at opposite sides of the mating housing 50 in the pitch direction.

The island-like portion 56 of the present embodiment has a groove 57 and two projecting walls 58. The groove 57 opens at opposite sides thereof in the pitch direction. The groove 57 has opposite ends in the pitch direction each of which is a groove with a bottom and is recessed downward. The middle of the groove 57 in the pitch direction is a hole which passes through the mating housing 50 in the upper-lower direction. The projecting walls 58 are located at opposite sides of the groove 57 in the lateral direction, respectively, and extend along the groove 57, or along the opposite sides of the groove 57 in the lateral direction. In other words, each of the projecting walls 58 is located between the groove 57 and one of the mating sidewalls 52 in the lateral direction.

The island-like portion 56 of the present embodiment has the aforementioned structure. However, the present invention is not limited thereto. For example, the groove 57 may be a groove with a bottom along its entire length in the pitch direction. Thus, the hole of the groove 57 may not be formed. Each of the projecting walls 58 may include two parts which are apart from each other in the pitch direction.

Referring to FIG. 8, the mating terminals 60 are divided into two mating terminal rows 60R which correspond to the mating sidewalls 52, respectively. The mating terminals 60 of each of the mating terminal rows 60R are arranged in regular intervals in the pitch direction. Each of the mating terminal rows 60R of the present embodiment includes a large number of mating inner terminals 61 and a large number of mating outer terminals 62. However, the present invention is not limited thereto. For example, each of the mating terminal rows 60R may include only one or more of the mating inner terminals 61 or may include only one or more of the mating outer terminals 62.

Referring to FIGS. 14 and 15, the mating inner terminals 61 of the present embodiment have shapes same as each other. The mating outer terminals 62 of the present embodiment have shapes same as each other. The mating inner terminal 61 and the mating outer terminal 62 have structures same as each other. Each of the mating inner terminals 61 and the mating outer terminals 62 is a single metal plate with bends. Each of the mating inner terminals 61 and the mating outer terminals 62 has a held portion 63, a solderable portion 64 and a spring portion 66.

Each of the held portions 63 of the mating inner terminals 61 is press-fit into and is held by the projecting wall 58 of the island-like portion 56. Each of the held portions 63 of the mating outer terminals 62 is press-fit into and is held by the corresponding mating sidewall 52. However, the present invention is not limited thereto. For example, the held portions 63 may be insert-molded in the mating housing 50.

Each of the solderable portions 64 of the mating inner terminals 61 of the present embodiment is partially located in the groove 57. Each of the solderable portions 64 of the mating outer terminals 62 of the present embodiment extends outward from the held portion 63 in the lateral direction and is partially located outward of the corresponding mating sidewall 52 in the lateral direction. Referring to FIG. 8, when the mating connector 16 is mounted on the mating board 84, each of the solderable portions 64 is soldered on a conductive pad (not shown) of the mating board 84. The solderable portions 64 which are arranged as described above can be visually inspected along the upper-lower direction for whether they are properly soldered on the mating board 84.

Referring to FIGS. 14 and 15, each of the spring portions 66 of the mating inner terminals 61 and the mating outer terminals 62 of the present embodiment has a U-like shape and is resiliently deformable. Each of the spring portions 66 is provided with two contact points 68. The two contact points 68 of each of the mating terminals 60 are located on opposite sides of the spring portion 66 in the lateral direction, respectively, and face each other in the lateral direction. Under the mated state, the contact points 68 of each of the mating inner terminals 61 are brought into contact with the contact points 33 of each of the inner terminals 31 of the connector 12, and the contact points 68 of each of the mating outer terminals 62 are brought into contact with the contact points 37 of each of the outer terminals 35 of the connector 12. As a result, the connector 12 and the mating connector 16 are electrically connected with each other.

Referring to FIG. 8, according to the present embodiment, the mating inner terminals 61 and the mating outer terminals 62 of each of the mating terminal rows 60R are alternately arranged along the pitch direction. This arrangement reduces a distance between two of the mating terminals 60 adjacent to each other in the pitch direction while a distance between two of the solderable portions 64 adjacent to each other in the pitch direction is kept to a value which is sufficiently large to prevent the solderable portions 64 from being short-circuited to each other. As a result, the mating connector 16 can be reduced in size in the pitch direction. However, the present invention is not limited thereto. For example, in each of the mating terminal rows 60R, two or more of the mating inner terminals 61 may be adjacent to each other, or two or more of the mating outer terminals 62 may be adjacent to each other.

Figure 11:
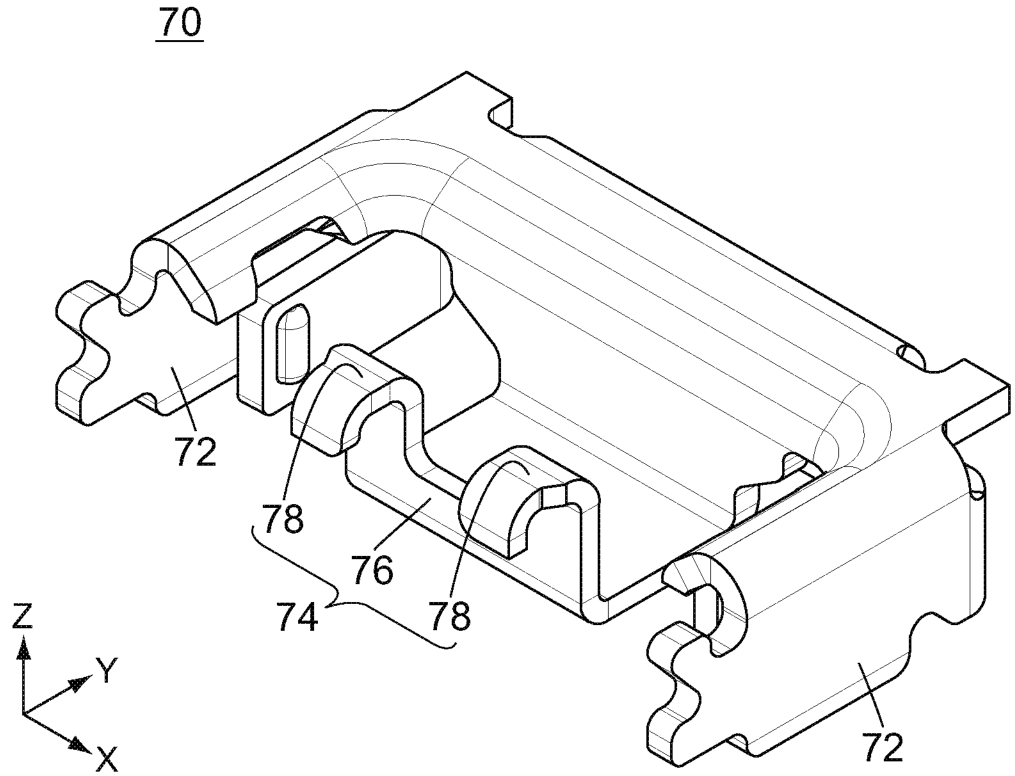
FIG. 11 is a perspective view showing a mating holddown of the mating connector of FIG. 8.

Referring to FIG. 11 together with FIG. 8, each of the mating holddowns 70 of the present embodiment is a single metal plate with bends. The mating holddowns 70 have shapes same as each other. Each of the mating holddowns 70 has a fixable portion 72 and a guide 74. Thus, the mating connector 16 comprises the guides 74 each made of metal. Referring to FIG. 8 together with FIG. 9, the mating holddowns 70 are insert-molded in the opposite ends of the island-like portion 56 in the pitch direction, respectively, and strengthen the mating housing 50. When the mating connector 16 is mounted on the mating board 84, the fixable portions 72 are soldered on the mating board 84.

Figure 9:
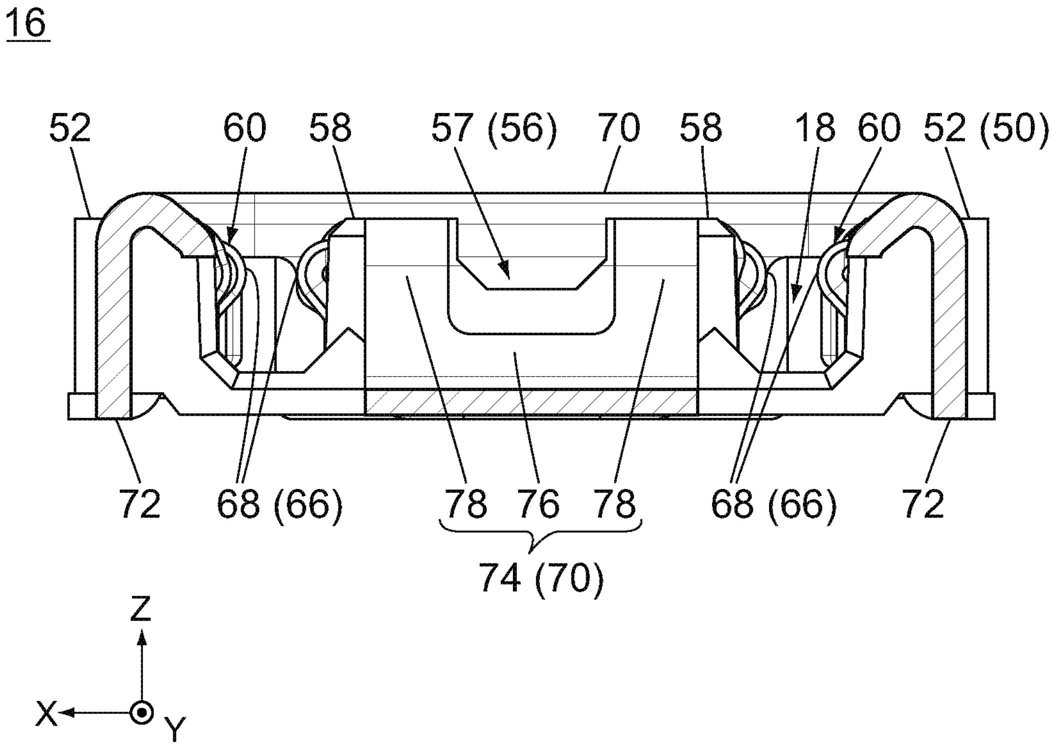
FIG. 9 is a cross-sectional view showing the mating connector of FIG. 8, taken along line IX-IX.

Referring to FIG. 11, each of the guides 74 has a body 76 and two protecting portions 78. In each of the guides 74, the protecting portions 78 are located at opposite sides of the body 76 in the lateral direction, respectively, and extends upward and inward in the pitch direction from the body 76. Referring to FIG. 9 together with FIG. 8, the body 76 of each of the guides 74 covers an end of the island-like portion 56 in the pitch direction. The protecting portions 78 of each of the guides 74 cover and protect ends of the projecting walls 58 in the pitch direction, respectively.

Figure 13:
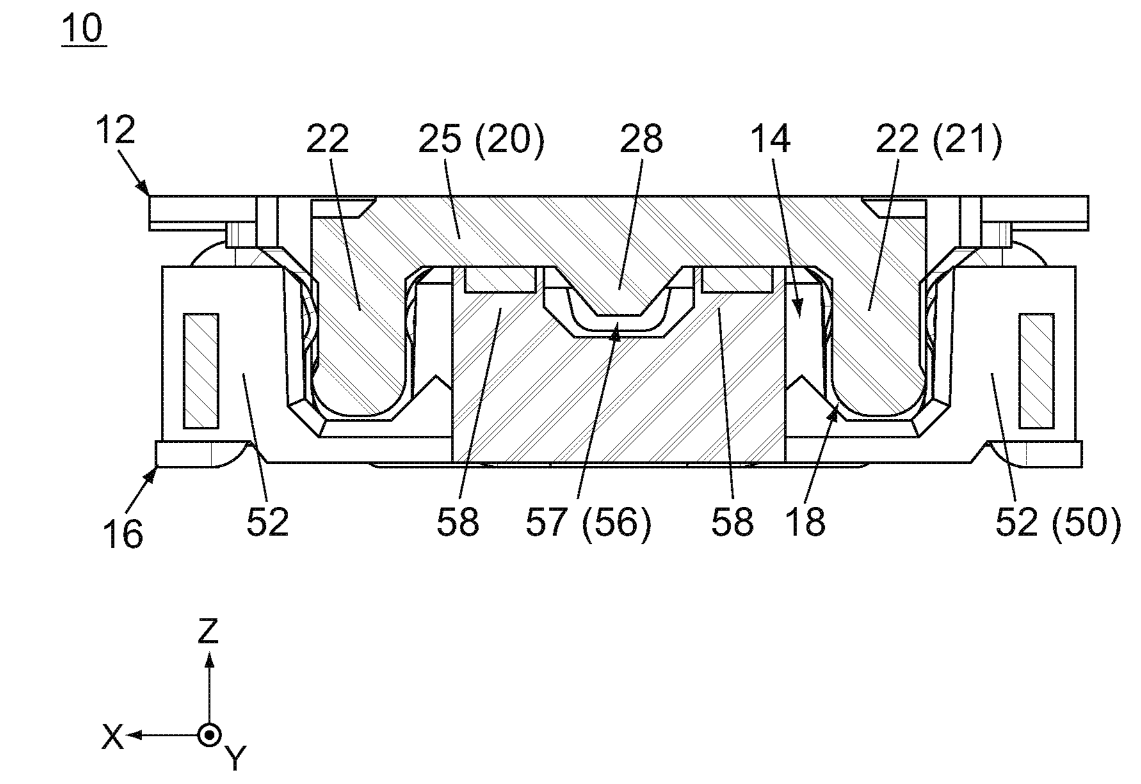
FIG. 13 is a cross-sectional view showing the connection device of FIG. 12, taken along line XIII-XIII.

Referring to FIG. 1 together with FIG. 8, the mating connector 16 of the present embodiment has a mating receiving portion 18. The mating receiving portion 18 is a space enclosed by the mating sidewalls 52 and the mating holddowns 70. The mating receiving portion 18 encloses the island-like portion 56 in the XY-plane. Referring to FIG. 13, under the mated state, the island-like portion 56 of the mating connector 16 is received in the receiving portion 14 of the connector 12, and the sidewalls 22 of the connector 12 are received in the mating receiving portion 18 of the mating connector 16. As can be seen from this structure, the island-like portion 56 of the present embodiment works as a guide portion similarly to an existing typical island-like portion (not shown) in a mating process in which the connector 12 is mated with the mating connector 16.

Referring to FIG. 13 together with FIG. 9, the island-like portion 56 of the present embodiment has the groove 57, which is recessed downward, different from the existing typical island-like portion (not shown). In particular, each of opposite ends of the island-like portion 56 in the pitch direction has a U-like structure in a predetermined plane (XZ-plane). Each of the guides 74 also has a U-like structure in the XZ-plane. According to the aforementioned structure, the groove 57 of the island-like portion 56 receives the projecting portion 28 of the connector 12 under the mated state. Referring to FIG. 12 together with FIG. 13, since the projecting portion 28 is received in the groove 57 under the mated state, a distance between the board 82 and the mating board 84 can be reduced under the mated state in spite of the projecting portion 28 provided to the connector 12.

As can be seen from the explanation described above, the mating connector 16 has a structure corresponding to the connector 12. The present embodiment provides the mating connector 16 having a structure corresponding to the connector 12, or the mating connector 16 mateable with the connector 12.

What is claimed is:

1. A connector comprising a housing and a plurality of terminals, wherein:

the housing has two sidewalls, two edge walls and a bottom portion;

each of the sidewalls extends along a pitch direction;

the sidewalls are apart from each other in a lateral direction perpendicular to the pitch direction;

the edge walls are located at opposite ends of the housing in the pitch direction, respectively;

the bottom portion couples the sidewalls together;

the bottom portion has a projecting portion and two base portions which correspond to the sidewalls, respectively;

the base portions are located at opposite sides of the projecting portion in the lateral direction, respectively;

the projecting portion projects from the base portions in an upper-lower direction perpendicular to both the pitch direction and the lateral direction and is connected to at least one of the edge walls in the pitch direction;

each of the base portions has at least one predetermined portion;

each of the predetermined portions includes two passing holes and a separating portion;

each of the passing holes passes through the base portion in the upper-lower direction;

each of the separating portions separates the two passing holes from each other in the pitch direction and is connected to the projecting portion and a corresponding one of the sidewalls in the lateral direction;

the terminals are divided into two terminal rows which correspond to the sidewalls, respectively;

each of the terminal rows includes at least two inner terminals;

each of the inner terminals has a held portion and a solderable portion;

the held portion of each of the inner terminals is held by a corresponding one of the sidewalls; and the solderable portions of the inner terminals are partially located in the passing holes, respectively.

2. The connector as recited in claim 1, wherein the projecting portion is connected to the two edge walls in the pitch direction.

3. The connector as recited in claim 1, wherein:

each of the terminal rows includes at least one outer terminal;

each of the outer terminals has a held portion and a solderable portion;

the held portion of each of the outer terminals is held by a corresponding one of the sidewalls;

the solderable portion of each of the outer terminals is located outward of a corresponding one of the sidewalls in the lateral direction; and the inner terminals and the outer terminal of each of the terminal rows are alternately arranged in the pitch direction.

4. The connector as recited in claim 1, wherein the passing holes of one of the base portions and the passing holes of a remaining one of the base portions are alternately arranged in the pitch direction.

5. The connector as recited in claim 1, wherein:

the connector has a receiving portion; and the receiving portion is a space enclosed by the sidewalls, the edge walls and the bottom portion.

6. A mating connector mateable with the connector as recited in claim 5, wherein:

the mating connector comprises a mating housing and a guide made of metal;

the mating housing has an island-like portion;

the island-like portion is received in the receiving portion of the connector under a mated state where the connector and the mating connector are mated with each other;

the island-like portion has a groove and two projecting walls;

the projecting walls are located at opposite sides of the groove in the lateral direction, respectively;

the groove receives the projecting portion of the connector under the mated state;

the guide has a body and two protecting portions;

the body covers an end of the island-like portion in the lateral direction; and the protecting portions extend from the body and cover and protect ends of the projecting walls in the pitch direction, respectively.

7. A connection device comprising the connector as recited in claim 5 and a mating connector, wherein:

the mating connector comprises a mating housing and a guide made of metal;

the mating housing has an island-like portion;

the island-like portion is received in the receiving portion of the connector under a mated state where the connector and the mating connector are mated with each other;

the island-like portion has a groove and two projecting walls;

the projecting walls are located at opposite sides of the groove in the lateral direction, respectively;

the groove receives the projecting portion of the connector under the mated state;

the guide has a body and two protecting portions;

the body covers an end of the island-like portion in the lateral direction; and the protecting portions extend from the body and cover and protect ends of the projecting walls in the pitch direction, respectively.

* * * * *